(12) United States Patent
Wolf et al.

(10) Patent No.: US 6,349,221 B1
(45) Date of Patent: Feb. 19, 2002

(54) DISPLAY FOR A PORTABLE DEVICE

(75) Inventors: Mats Erik Wolf, Södra Sandby (SE); Claes Henry Von Schéele, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/333,654

(22) Filed: Jun. 16, 1999

(30) Foreign Application Priority Data

Jun. 17, 1998 (GB) ............................................. 9813116

(51) Int. Cl.7 .............................. H04B 1/38; G09G 3/38
(52) U.S. Cl. ...................... 455/566; 455/574; 455/575; 455/90; 455/351; 345/105; 345/6
(58) Field of Search ................................ 455/566, 574, 455/575, 90, 347, 351; 345/4, 105, 87, 169, 5

(56) References Cited

U.S. PATENT DOCUMENTS

| 4,154,512 | A | | 5/1979 | Rode .......................... 351/265 |
|---|---|---|---|---|
| 5,465,401 | A | | 11/1995 | Thompson .................. 455/566 |
| 5,566,224 | A | | 10/1996 | ul Azam et al. ............. 455/566 |
| 5,734,628 | A | | 3/1998 | Akasaka ...................... 368/232 |
| 5,808,711 | A | * | 9/1998 | Suppelsa et al. .............. 345/49 |
| 5,878,353 | A | * | 3/1999 | Ul Azam et al. ........... 455/566 |
| 5,896,575 | A | * | 4/1999 | Higginbotham et al. .... 455/566 |

FOREIGN PATENT DOCUMENTS

| EP | 0 426 163 | 5/1991 | ............ G07C/9/00 |
|---|---|---|---|
| EP | 0682434 | 11/1995 | ............ H04M/1/72 |
| FR | 2683655 | 5/1993 | ............ G09F/9/30 |
| JP | 1201698 | 8/1989 | ............ G09G/3/16 |
| WO | 95/34088 | 12/1995 | ............ H01J/29/89 |

* cited by examiner

*Primary Examiner*—William Trost
*Assistant Examiner*—Rafael Perez-Gutierrez
(74) *Attorney, Agent, or Firm*—Burns, Doane, Swecker & Mathis, L.L.P.

(57) ABSTRACT

A portable device, for example a portable phone (1), has a display comprising a first element (2) and a second element (3). The first element (2) is adapted to display information, and the second element (3) is an electrochromic element, which at least partially covers the first element (2). This has the advantage of allowing the electrochromic window to enhance the design flexibility of the display. In addition, the display enables power consumption to be saved in a portable device having such first and second elements, by switching off the first display element when the device is placed into a standby mode, and switching the electrochromic element into a non-transparent state to indicate that it is in said standby mode. The device may also be used with other portable devices such as a personal organizer or laptop computer.

22 Claims, 2 Drawing Sheets

DISPLAY FOR A PORTABLE DEVICE

FIELD OF THE INVENTION

The present invention relates generally to using an electrochromic window as part of the display screen of a portable device, in particular a mobile telephone. The aim of the invention is improve the design flexibility of the display and to minimize the power consumption of the portable device.

BACKGROUND OF THE INVENTION

Users of portable devices such as mobile telephones continually require more and more functions. This means that the display sections of these devices need to show more and more information. Often, this can lead to more confusion rather than understanding. In addition, because there is more information being displayed, the power consumption of the device increases. The present invention aims to overcome these disadvantages by using an electrochromic window to enhance the portable device's conventional display.

Electrochromism is a term used to describe the phenomenon that certain materials can change colour (i.e. change their optical absorption) reversibly when their composition is changed by use of an electrochemical cell. An electrochromic window is therefore a device that can switch colour dynamically by applying a voltage. The degree of coloration can be controlled by the amount of charge passed through the cell. Electrochromic windows typically require low power and are stable in any given state, i.e. they keep the same colour after being switched off.

Electrochromic windows are typically thin film devices that can be coated onto glass. A typical application is for tinting the windows on cars or buildings to prevent sunlight from passing through.

SUMMARY OF THE INVENTION

According to a first aspect of the invention, there is provided a portable device having a display comprising first and second elements, wherein the first element is adapted to display information, and the second element is an electrochromic element, which at least partially covers the first element.

This has the advantage of allowing the electrochromic window to enhance the design flexibility of the display.

Preferably, the first element is the standard display of a mobile telephone, or other portable device such as a personal organizer or laptop computer.

According to a second aspect of the invention, there is provided a method of saving power in a portable device having a display comprising first and second elements, the first element being adapted to display information and the second element being an electrochromic element, which at least partially covers the first element, the method comprising the steps of:

a) switching off the first display element when the device is placed into a standby mode; and b) switching the electrochromic element into a non-transparent state.

This has the advantage of saving power since the first element is turned off, and instead, the low power electrochromic window is used to indicate that the device is in the standby mode.

BRIEF DESCRIPTION OF THE DRAWINGS

For a better understanding of the present invention, reference will now be made, by way of example, to the accompanying drawings, in which.

DETAILED DESCRIPTION OF THE PREFERRED EMBODIMENT

Figure 1:
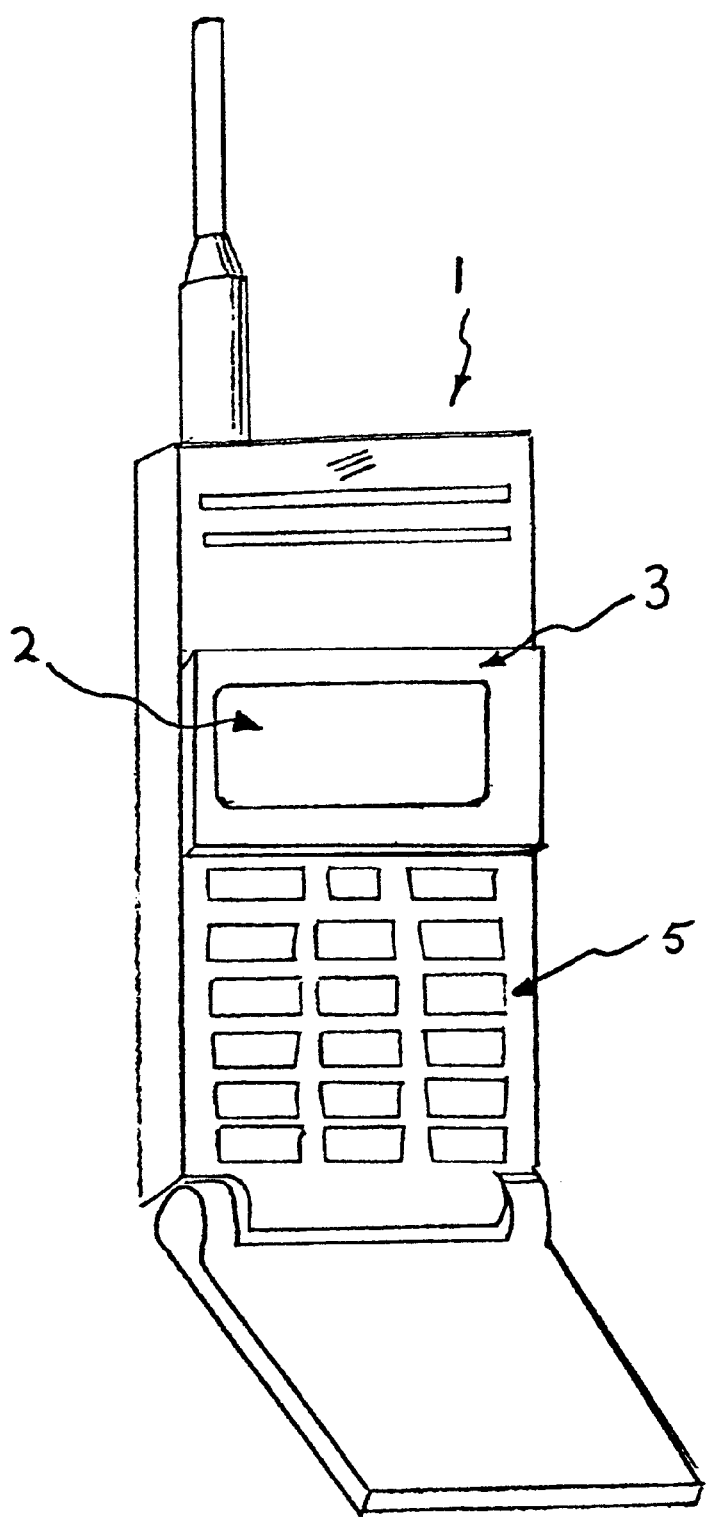
FIG. 1 shows an example of the present invention when applied to a mobile telephone, with the electrochromic window in a transparent state.

FIG. 1 shows a preferred embodiment of the invention, whereby a mobile telephone 1 uses an electrochromic window 3 in addition to the phone's display 2, for example a LCD. The electrochromic window 3 covers a part or preferably all of the display 2. In FIG. 1, the electrochromic window 3 is in its transparent state, and so the contents of the display 2 are visible. This has the advantage of enabling the electrochromic window to enhance the design flexibility of the display as a whole. For example, the phone may be provided with a display which can show several lines of text. In order to simplify use in some modes of operation, the electrochromic window may be controllable in sections which cover the different lines of the display.

In this illustrated embodiment, the phone has a keypad 5 with buttons which need to be depressed. However, in an alternative embodiment, the phone may have a touchscreen keypad, which covers the display. Preferably, in such an embodiment, the electrochromic window is placed between the display and the touchscreen keypad.

Figure 2:
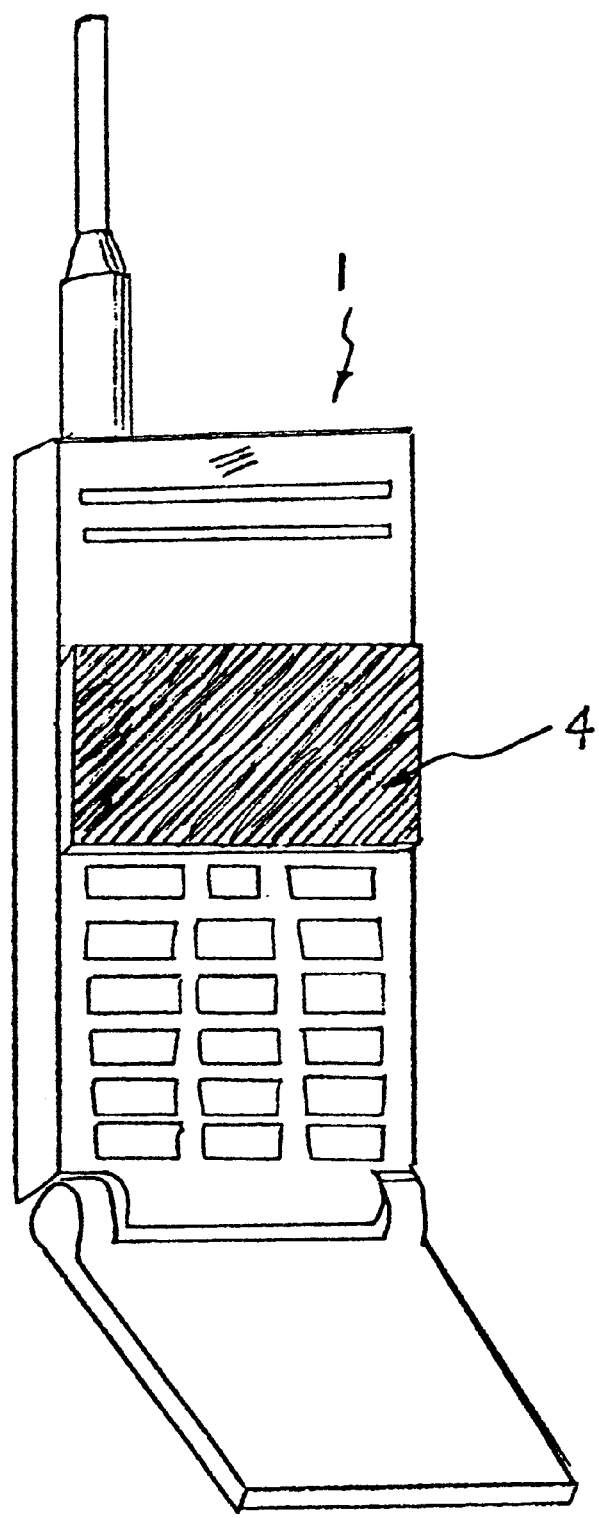
FIG. 2 shows an example of the present invention when applied to a mobile telephone, with the electrochromic window in a non-transparent state.

FIG. 2 shows how the invention can be used in its simplest form, to indicate that the mobile phone is switched off. The electrochromic window 4 can be made coloured (non-transparent) when the phone is switched off, as opposed to being transparent (see FIG. 1) when the phone is switched on. The use of the electrochromic window in this manner provides a clear indication to the user that the telephone is switched off.

Preferably, the electrochromic window could also be made non-transparent to work as a "screen-saver" when the phone is switched on, but not in use, that is, in its standby mode. Conventional phones need to have the LCD illuminated even when in standby mode to indicate that the phone is in standby. This means that the telephone's display is still consuming power in the standby mode.

However, according to the present invention, the LCD can be turned off and the electrochromic window used instead to indicate that the phone is in its standby mode. This has the advantage of saving power since the electrochromic window does not consume power in its steady state.

In a preferred embodiment, a second non-transparent mode, different from that used to show that the telephone is switched off, can be used to indicate standby mode. For example, the current/voltage applied to the electrochromic window may be such as to change it to a different colour from the non-transparent state shown in FIG. 2. Alternatively, the electrochromic window can comprise two or more different electrochromic materials with different optical properties, with the different non-transparent states of the two materials indicating different modes of operation of the phone, such as switched off and standby mode.

Preferably, if sections of the electrochromic window are independently controllable, a particular pattern of transparent and non-transparent sections can be used to indicate a particular mode, such as standby mode. Since the electrochromatic window uses less power in its steady state, the power consumption of the mobile telephone is reduced. This means that the mobile phone can be used for longer periods before re-charging is required.

Although the preferred embodiment relates to a mobile telephone, the invention may also be applied to other portable devices such as personal organizers and laptop computers.

What is claimed is:

1. A method of saving power in a portable device having a display made up of two elements, the first element being adapted to display information and the second element being an electrochromic element, which at least partially covers the first element, the method comprising the steps of:

a) switching off the first element when the device is placed into a standby mode; and b) switching the electrochromic element into a non-transparent state.

2. A method as claimed in claim 1 whereby the portable device is a mobile telephone.

3. A portable device having a display comprising first and second elements, wherein said first element is adapted to display information, and said second element is an electrochromic element which at least partially covers said first element, wherein at least a portion of said electrochromic element which covers said first element has transparent and non-transparent sections for conveying information, wherein, when the device is in a standby mode, the first display element is turned off and the electrochromic element is put into a second non-transparent state.

4. A portable device having a display comprising first and second elements, wherein said first element is adapted to display information, and said second element is an electrochromic element which at least partially covers said first element, wherein at least a portion of said electrochromic element which covers said first element has transparent and non-transparent sections for conveying information, wherein the electrochromic element comprises at least two electrochromic materials, each one being used to represent a certain state.

5. A portable device having a display comprising first and second elements, wherein the first element is adapted to display information, and the second element is an electrochromic element, which at least partially covers the first element, wherein at least a portion of said electrochromic element which covers said first element has a non-transparent section, wherein the electrochromic element comprises at least two electrochromic materials, each one being used to represent a certain state.

6. A portable device as claimed in claim 5, wherein the electrochromic element comprises a single electrochromic material providing first and second non-transparent states depending on an electrical signal applied thereto.

7. A portable device as claimed in claim 5, wherein the electrochromic element is made transparent when the device is switched on, and put into a first non-transparent state when the device is switched off.

8. A portable device as claimed in claim 5, wherein, when the device is in a standby mode, the first display element is turned off and the electrochromic element is put into a second non-transparent state.

9. A portable device as claimed in claim 5 wherein the electrochromic element is placed between the first display element and the touchscreen keypad, and at least partially covers the first display element.

10. A portable device as claimed in claim 5, further comprising a touchscreen keypad.

11. A portable device as claimed in claim 5, wherein the device is a mobile telephone.

12. A portable device having a display comprising first and second elements, wherein said first element is adapted to display information, and said second element is an electrochromic element which at least partially covers said first element, wherein at least a portion of said electrochromic element which covers said first element has a non-transparent section, wherein when said device is in a standby mode, said first display element is turned off and said electrochromic element is put into a second non-transparent state.

13. A portable device as claimed in claim 12, wherein the electrochromic element comprises a single electrochromic material providing first and second non-transparent states depending on an electrical signal applied thereto.

14. A portable device as claimed in claim 12, wherein the electrochromic element is made transparent when the device is switched on, and put into a first non-transparent state when the device is switched off.

15. A portable device as claimed in claim 12, further comprising a touchscreen keypad.

16. A portable device as claimed in claim 15 wherein the electrochromic element is placed between the first display element and the touchscreen keypad, and at least partially covers the first display element.

17. A portable device having a display comprising first and second elements, wherein said first element is adapted to display information, and said second element is an electrochromic element which at least partially covers said first element, wherein at least a portion of said electrochromic element which covers said first element has transparent and non-transparent sections for conveying information while the first element is displaying information.

18. A portable device as claimed in claim 17, wherein the electrochromic element comprises a single electrochromic material providing first and second non-transparent states depending on an electrical signal applied thereto.

19. A portable device as claimed in claim 17, wherein the electrochromic element is made transparent when the device is switched on, and put into a first non-transparent state when the device is switched off.

20. A portable device as claimed in claim 17, further comprising a touchscreen keypad.

21. A portable device as claimed in claim 20, wherein the electrochromic element is placed between the first display element and the touchscreen keypad, and at least partially covers the first display element.

22. A portable device as claimed in claim 17, wherein the device is a mobile telephone.

\* \* \* \* \*